United States Patent [19]

Prasad et al.

[11] Patent Number: 5,758,344

[45] Date of Patent: May 26, 1998

[54] METHOD AND APPARATUS FOR MOVING SUBTREES IN A DISTRIBUTED NETWORK DIRECTORY

[75] Inventors: Ranjan Prasad; Dale R. Olds, both of Sandy, Utah

[73] Assignee: Novell, Inc., Orem, Utah

[21] Appl. No.: 741,977

[22] Filed: Oct. 31, 1996

Related U.S. Application Data

[63] Continuation of Ser. No. 357,466, Dec. 15, 1994, Pat. No. 5,608,903.

[51] Int. Cl.$^6$ ............................................. G06F 17/30
[52] U.S. Cl. ............................ 707/10; 707/103; 707/2
[58] Field of Search ............................ 395/610, 161; 707/10, 103, 2

[56] References Cited

U.S. PATENT DOCUMENTS

| | | | |
|---|---|---|---|
| 5,001,628 | 3/1991 | Johnson et al. | 364/200 |
| 5,032,979 | 7/1991 | Hecht et al. | 364/200 |
| 5,113,519 | 5/1992 | Johnson et al. | 395/600 |
| 5,367,698 | 11/1994 | Webber et al. | 395/800 |
| 5,410,691 | 4/1995 | Taylor | 395/600 |
| 5,418,942 | 5/1995 | Krawchuk et al. | 395/600 |
| 5,418,966 | 5/1995 | Madduri | 395/725 |
| 5,557,731 | 9/1996 | Li et al. | 395/161 |
| 5,560,005 | 9/1996 | Hoover et al. | 395/600 |

FOREIGN PATENT DOCUMENTS 0663640  1/1995  European Pat. Off. .

OTHER PUBLICATIONS

Exploiting Read–Mostly Workloads in the FileNet File System, David A. Edwards and Martin S. McKendry, 8283 Operating Systems Review (SIGOPS) 23 (1989) No. 5 New York, US.

Elias Drakopoulos and Matt Merges, "Performance study of client–server storage system", IEEE, 1991, pp. 67–72.

Bhide et al. "A comparison of two Approaches to build reliable distributed file servers", IEEE, 1991, pp. 616–623.

Mutka et al. "Managing personal files across independent file management units", IEEE, 1992, pp. 254–261.

Accessing Files in an Internet: The Jade File System, Herman C. Rao and Larry L. Peterson. 8198 IEEE Transaction on Software Engineering 19 (1993) Jun., No. 6, New York, US.

R.T. Hurley et al. "Limited effects of finite storage on a beneficial file migration policy"; IEEE 1994, pp. 432–439.

Elias Drakopoulos and Matt Merges, "Performance study of client–server storage system", IEEE 1992, vol. 41; No. 11; pp. 1442–1452.

Robert Cowart, "Mastering Windows 3.1"; 1992, SYBEX Inc.; pp. 132–141.

Primary Examiner—Thomas G. Black
Assistant Examiner—Cheryl Lewis
Attorney, Agent, or Firm—Dinsmore & Shohl LLP

[57] ABSTRACT

A method of moving leaf objects and subtrees in computer networks that employ a distributed network directory is disclosed. The method employs the existing directories and an authentication procedure for each server. A first object that is under the physical control of the administrator of one partition of the distributed network directory requests access to a second object that is under the physical control of the administrator of another partition of the distributed network directory. The directory verifies that the access control list of the first object includes the second object. The access control list of the second object is then checked to verify that it includes a reference to the first object as an object that is permitted access to the second object. As a result, access is only granted in response to requests from objects that appear in the access control list of the second object. a method of synchronizing the access control lists based upon an authoritative access control list is also disclosed.

31 Claims, 4 Drawing Sheets

|         | ROOT      | A         | B         | C      | D         | E         |
|---------|-----------|-----------|-----------|--------|-----------|-----------|
| SERVER S | MASTER   | —         | MASTER    | MASTER | READ ONLY | MASTER    |
| SERVER T | READ ONLY | MASTER    | SECONDARY | —      | MASTER    | —         |
| SERVER U | —         | READ ONLY | SECONDARY | —      | READ ONLY | SECONDARY |
FIG. 3
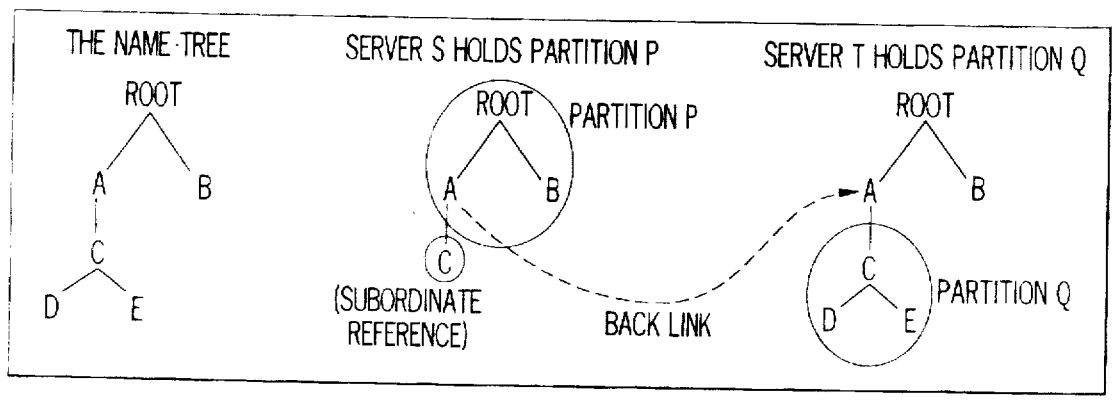
FIG. 4
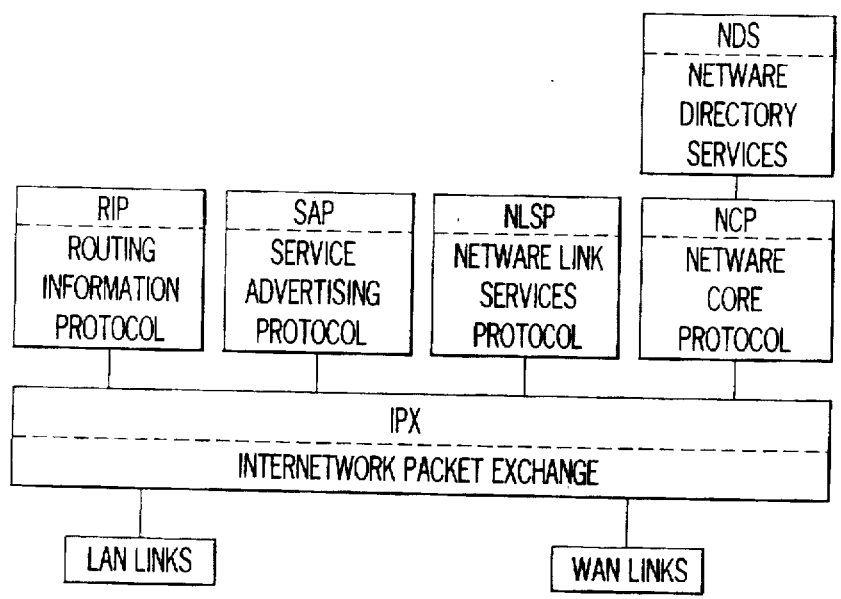
FIG. 5

METHOD AND APPARATUS FOR MOVING SUBTREES IN A DISTRIBUTED NETWORK DIRECTORY

This is a continuation of application Ser. No. 08/357,466 filed on Dec. 15, 1994 and now U.S. Pat. No. 5,608,903.

BACKGROUND OF THE INVENTION

The present invention relates to the management of distributed digital network directories, and particularly to moving an object or subtree of a distributed digital Technological advances in microelectronics and digital computing systems have resulted in the proliferation of digital computer networks, enabling the distribution of networking services across a wide range of computers participating in the network and over various communications media. Advances in distributing applications have also resulted in a client-server architecture for applications. Under the architecture, the portions of the application that interact with the user are typically separated from the portions of the application that fulfill client processing requests. Typically, the portions of an application that interact with the user are called a client applications or client software, whereas the portions of the application that service requests made by the client applications are called a server applications or server software. In a network environment, the client applications and server applications are generally executed on different computers.

Historically, digital networks in the form of local area networks, a physical collection of personal computers interconnected with network cabling and network interface cards, consisted of a single network server and multiple network clients. To manage which network clients could access the network server, as well as what files, printers, printer queues, and server applications were available to the network clients, the network server maintained information on each of the resources that were attached to the server and the identities of the network clients and users who could use the services of the network server and the scope and nature of the services available to the network clients and users.

As local area networks became more popular, networks grew in size requiring several servers to service the needs of users. With increased size and complexity of networks, came the need for easier management of network servers. Users required access to an increasing number of services that were located on an increasing number of network servers. Several vendors began offering networking servers. Each vendor implemented a different scheme of providing networking services information. In addition, each network server, because of the way the server maintained information about only its networking services still required management of its resources independently of other network servers.

This insular method of maintaining information of networking services fueled research and development of distributed networking directories, databases that spanned networking servers. Thus far, research has resulted in several potential solutions. Three technologies currently hold greater promise for replacing the large number of insular, idiosyncratic directories that now litter many an enterprise's numerous local-area networks and electronic-mail systems. One approach exploits the X.500 distributed network information directory services protocol developed as published by the CCIT and Open Systems Interconnect consortium.

However, while the X.500 protocol appears to hold the greatest promise to provide a robust, distributed directory, the X.500 protocol has been slow to gain acceptance. The X.500 protocol has been plagued from the start with management, interoperability and security problems. The X.500 protocol specification describes a technical framework, interoperability requirements and compliance criteria but does not describe specific implementations. Thus many of the details of implementation have been left up to systems providers.

The X.500 protocol specification describes a distributed directory. The directory provides information services to network clients. The information in the directory can be read as well as modified by users who have applicable access rights.

The information stored in the directory is a collection of objects with associated attributes or properties. FIG. 1 shows an object called "Computer" with some associated properties, such as owner, operator, status, etc. The values of the properties are not shown in the figure but an example of a value for "Owner" might be "Fred." Objects in the directory and their names correspond to things that humans relate to when dealing with computers, namely, users, printers, print queues, networks and information Objects such as countries, organizations, networks, people and computers are objects you might find in the directory as well.

The directory provides information to users by giving users a hierarchical view of all of the information contained in the directory. The hierarchical view is generally in the form of a tree. FIG. 2 shows a directory. Each of the branches and terminating points or leaves represent objects in the directory. Generally, implementations of the directory organize objects in subtrees, partitions or domains. FIG. 2 also shows the directory organized into partitions or domains. Multiple copies of each partition may be stored in the directory. Software schemas define and determine the number and types of replicas of each partition.

Multiple replicas of a partition are needed to reduce network storage and traffic requirements and speed up directory searches. Replicas are stored in name servers. A name server is a computer in the network, usually a network server. More than one partition can be stored in a name server. Partitions stored in a name server need not be contiguous.

The directory tree provides a logical means of searching for information. The tree is generally patterned after logical groupings such as organizations, organizational units, computers and users. These logical groupings, while extremely useful in helping users find relevant information also creates significant problems in managing the directory.

Each partition forms a major subtree of the directory. Taken together, the partitions form a hierarchical tree of partitions that leads back to a root partition containing the root directory. Where boundaries of two partitions meet, the partition closer to the root is considered superior, and the partition farther from the root is considered subordinate. Thus, FIG. 2, partitions E and C are subordinate to the other partitions.

The present invention solves one of those problems. As objects of the directory change, the directory must be changed as well. Organizations, organizational units, computers and uses all move. Today, the legal department may be reporting through the finance department. Tomorrow, one of the employees of the finance department might be moved to marketing. Prior to the invention, systems administrators responsible for maintaining a directory had to move each object in the directory in response to a real change in the status of the object. Unfortunately, no facilities existed for moving course grain objects such as an entire department. If the legal department was to be moved to report to the finance department, each object in the legal subtree had to be moved separately.

SUMMARY OF THE INVENTION

With the present invention any portion of a directory tree provided that it is at the end of the tree may be moved either within a directory or to another directory. With the invention, ease of providing administration of distributed network directories increases. Accordingly, use of distributed network directories will also increase, making pervasive network computing possible.

BRIEF DESCRIPTION OF THE DRAWINGS

The present invention may be more fully understood by reference to the following Detailed Description in conjunction with the Drawings, in which:

FIG. 3 shows a hypothetical scheme of replicas

FIG. 4 shows how external references use back links.

FIG. 5 shows how the NDS protocol fits within the family of NetWare communications protocols.

DETAILED DESCRIPTION OF THE INVENTION

The present embodiment of the invention, Novell's NetWare Directory Service or NDS supports moving a terminal or leaf object or partition to allow reorganizing a subtree. Any portion of a directory tree provided that it is at the end of the tree may be moved either within a directory or to another directory.

NDS is based on the X.500 standard and implemented within Novell's NetWare network operating system. Novell implementation of NDS is based on the X.500 standard specification. The X.500 specification does not provide all of the details necessary to implement a distributed network directory.

NDS is implemented within the NetWare network operating system in terms of Novell's native NetWare protocols and a new native protocol called the NDS Protocol. The other components of the native protocols implemented in the NetWare network operating system are illustrated in FIG. 5. IPX is NetWare's native network layer protocol. It provides end-to-end, best-effort datagram delivery. It conveys traffic across a local area network (LAN), a wide area network (WAN), or any internetwork of connected WAN and LAN data-links of like or unlike kinds. An IPX internetwork address has three parts, a Network Number (four bytes) which identifies a network segment, a Node Number (six bytes) which identifies a computer on that segment, and a Socket Number (two bytes) which identifies a software entity within the computer. As an alternative to IPX, NetWare protocols can operate over IP.

The RIP (Routing Information Protocol) supports forwarding of IPX packets over an internetwork. Routers are the devices that connect network segments together. Traditionally, IPX routers exchange connectivity information with each other using RIP to determine proper paths for data packets to take. RIP uses a periodic broadcast mechanism.

The SAP (Service Advertising Protocol) is similar in concept to RIP, but the information exchanged describes services and their addresses (rather than network connectivity). Routers disseminate SAP information as they do with RIP. Through SAP, clients can rendezvous with servers of many kinds. SAP is used to bootstrap a client into the NDS world: a client uses SAP to locate its first NDS server when initializing.

NLSP (NetWare Link Services Protocol) is a newer routing protocol designed to scale to larger environments than RIP and SAP. It plays the role of RIP and SAP for large internetworks. It conveys the same information as RIP and SAP, but instead of using periodic broadcast it sends updates when changes occur.

NCP (NetWare Core Protocol) implements NetWare services such as remote file access. As shown in FIG. 5, NDS packets ride inside NCP packets. While most of this description deals with NDS messages, implementing NDS also involves a few new NCP verbs.

Figure 6:
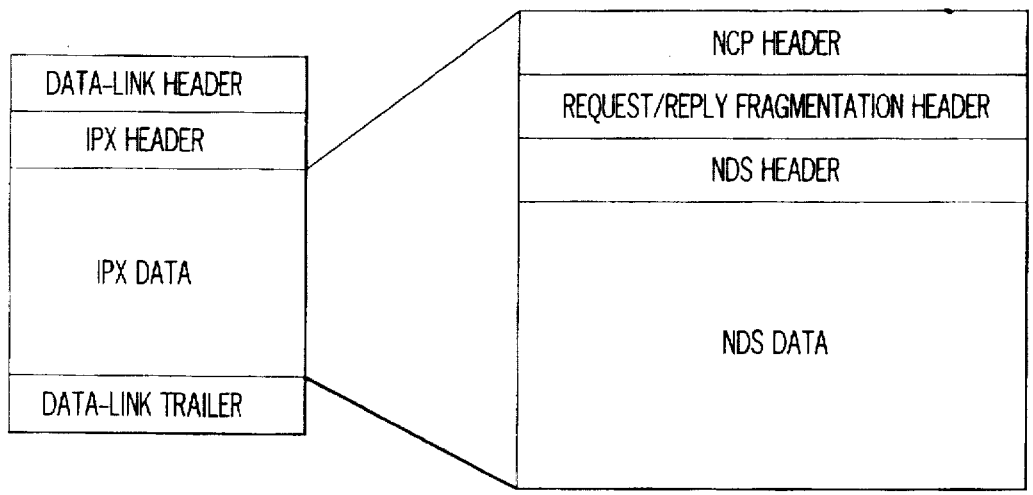
FIG. 6 shows the packet structure of NDS packets.

FIG. 6 shows the structure of NDS packets with NCP packets. The data-link header and trailer are media-specific, and are documented in the standard for each LAN or WAN technology. The message formats in this description define an offset for each field. The offset is from the start of the NCP portion of the packet. The first byte of the NCP header is at offset zero. The request/reply fragmentation header is the means of conveying an NDS request and response in a series of NCP request/response exchanges. The arrangement of fields in the NDS data portion of the packet varies, depending on the verb field of the NDS header. Later sections of this document specify the packet formats in detail.

A Completion Code field exists for NCP replies and for NDS replies that ride (fragmented) within NCP. In both cases, Completion Code=0 means "success." Nonzero values report various error conditions.

Moving a Leaf Object

From a network client vantage point, moving a subtree looks the same as moving a single leaf object. From a server standpoint moving a subtree and moving a single leaf object are quite different. The details of moving a leaf object are provided below. The details of moving an entire subtree, and the move from the vantage point of a server, are considered below. See "Moving a Subtree" below.

When a NDS network client moves an NDS directory entry from one container object to another in the tree, it is possible that the source and the destination container objects are in different partitions. A container object is any object that can hold another object, such as a subtree. When a network client moves the NDS entry, there might not be any servers holding a writable replica of both partitions.

Figure 1:
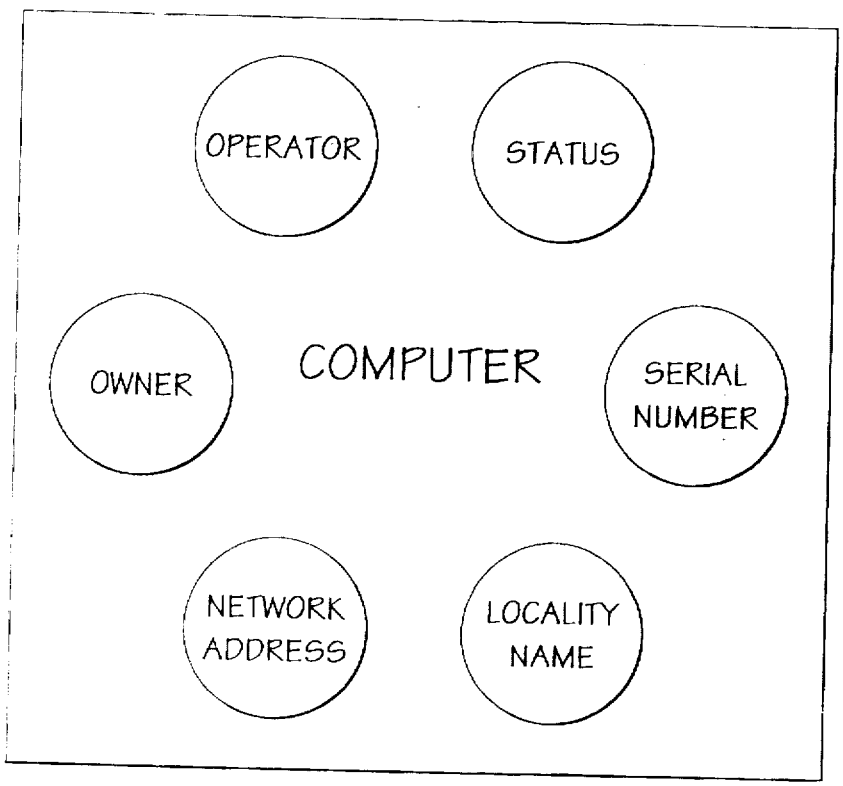
FIG. 1 shows a typical directory object, a computer, with some of its associated attributes.
Figure 2:
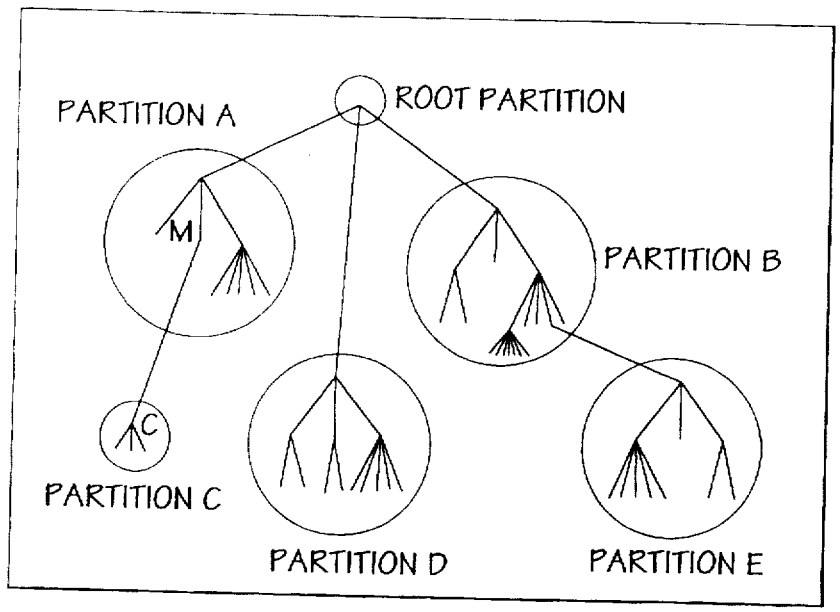
FIG. 2 shows a typical directory tree.

Each partition can have replicas on several servers. Suppose there are three NDS servers for a name tree: servers S, T, and U. One possible deployment of replicas for FIG. 2 among the servers is illustrated in FIG. 3. There are no restrictions on the placement of replicas together on servers; for example, the replicas stored together on a server need not represent contiguous partitions.

Sometimes, a name server has to keep information about objects that can be outside the replicas it holds. The best examples are the objects superior to its replicas in the tree. Consider FIG. 4. The objects A and Root are not in a replica of a partition on server T. But to know the name of objects in Q, T needs the name of A. This information is kept in a data structure called an external reference. Since an external reference is not in a replica, it is not synchronized with other servers. However, it does have an entry identification valid on the server where it resides (T in this case). If A's name changes, the external reference has to be updated. To allow this, the object A has a back link attribute value pointing to each external reference to A. This is the dotted line in FIG. 4.

Because there might not be any servers holding a writable replica of both partitions when a client attempts to move an NDS entry, moving an object involves two operations: "Begin Move Entry" and "Finish Move Entry."

The detailed steps of moving a leaf object are:

1. The client identifies two servers. The source server is the one holding the master replica of the object being moved. The destination server is the one holding the master replica of the container into which the object is being moved. Sometimes, the servers are the same, but the same procedure applies regardless.
2. The client sends a "Begin Move Entry" request to the destination server. At this point, the destination server enforces access control to permit or deny the operation. The "Begin Move Entry" NDS Protocol verb has the structure identified in Table 1.

TABLE 1

Begin Move Entry Structure (42 (0x2A))

Request Format
| Offset | Content | Type |
| --- | --- | --- |
| 32 | Version = 0 | Int4 |
| 36 | Flags = 0 | Int4 |
| 40 | Destination Parent Entry ID | Int4 |
| 36 | New RDN | Ustring |
| ... | Align4 | |
| ... | Source Server's DN | Ustring |

Reply Format
| 16 | Completion Code | Int4 |

*Int4 - a 4 byte integer transmitted in Low-High order
*Ustring - a null-terminated Unicode string. Unicode is a fixed-length character encoding scheme, 16 bits per character. It defines encodings from all the world's languages. The representation was chosen to have fixed width to facilitate processing. In Unicode, the range from 0x0000 through 0x007F is seven-bit ASCII (that is, ANSI X3.4).
*Align4 - is a pad field of zero to three bytes making the next field start on two-byte boundary.
*...- When a variable-length field occurs, the subsequent fields are not at a fixed offset. Ellipses appear in the offset column to indicate this.
*Completion Codes Success=0
*Distinguished Name or DN - is a representation of the sequence of hierarchical components. An NDS object is identified by its name and by the names of the objects in which it is contained, in a hierarchical tree structure. The object's own name is called its partial name, or RDN (for Relative Distinguished Name). Proceeding up the hierarchy, each containing object has its own RDN. For example, CN=Jan.O=Acme.C=US has three partial names (RDNs). The Common Name is "Jan." The Organization Name is "Acme," and, the Country Name "US."
This request is addressed to the server holding the master replica of the destination container.
The new parent of the NDS object is identified by Destination Parent Entry ID. Within that container, its relative distinguished name will be New RDN. The client also identifies the server holding the master replica of the existing entry, by sending the Source Server's DN.

3. If no anomalies are detected, the destination server replies with Success. At the same time it records the details of the move operation and starts a ten-minute timer. If the timer expires before the operation completes, it purges its record of the move and step 5 will not complete successfully.
4. The client makes a Finish Move Entry request to the source server. The Finish Move Entry NDS Protocol verb has the structure identified in Table 2.

TABLE 2

Finish Move Entry (43 (0x2B))

Request Format
| Offset | Content | Type |
| --- | --- | --- |
| 32 | Version = 0 | Int4 |
| 36 | Flags | Int4 |
| 40 | Source Entry ID | Int4 |
| 44 | Destination Parent Entry ID | Int4 |
| 48 | New RDN | Ustring |
| ... | Align4 | |
| ... | Destination Server's DN | Ustring |

Reply Format
| 16 | Completion Code | Int4 |

Flags
0x00000001 Remove Old Name Values
Completion Codes Success = 0

Remarks
This request is addressed to the server holding the master replica of the object being moved.
The Source Entry ID identifies the object on that server. The client identifies the server holding the master replica of the destination container by sending the Destination Server's DN. The Destination Parent Entry ID identifies the parent container itself. The new parent of the NDS object is identified by Destination Parent Entry ID. Within that container, its relative distinguished name will be New RDN. If the Remove Old Name Values flag is set, old values of the naming attribute remain as multiple values of the attribute (but not as part of the RDN). This choice is unavailable if the naming attribute is single-valued. If the flag is zero, all prior values of the naming attribute are deleted before New RDN is added.

5. The source server makes a Restore Entry request to the destination server to transfer the complete object information. This can take several iterations. If there is a temporary anomaly, this step is retried several times before completing or being abandoned. The structure of the Restore Entry NDS Protocol verb is provided in Table 3.

TABLE 3

Restore Entry (46 (0x2E))

Request Format
| Offset | Content | Type |
| --- | --- | --- |
| 32 | Version = 0 | Int4 |
| 36 | Request Flags | Int4 |
| 40 | Iteration Handle | Int4 |
| 44 | Parent Entry ID | Int4 |
| 48 | Relative Distinguished Name | Int4 |
| ... | Align4 | |
| ... | Source Distinguished Name! | Ustring |
| ... | Align4 | |
| ... | Data Size = N | Int4 |
| ... | Entry Data | Byte [N] |

Reply Format ... Moving = 0
| Offset | Content | Type |
| --- | --- | --- |
| 16 | Completion Code | Int4 |
| 20 | Iteration Handle | Int4 |

Reply Format ... Moving = 1 and More = 1
| Offset | Content | Type |
| --- | --- | --- |
| 16 | Completion Code | Int4 |
| 20 | Iteration Handle | Int4 |
| 24 | Reserved Field = 0 | Int4 |

Reply Format ... Moving = 1 and More = 0
| Offset | Content | Type |
| --- | --- | --- |
| 16 | Completion Code | Int4 |
| 20 | Reply Flags = 0x00000400 | Int4 |
| 24 | New Distinguished Name | Ustring |
| ... | Align4 | |
| ... | New Tuned Name | Tuned Name |

*Request Flags - 0x00000001 More, 0x00000002 Moving
*Reply Flags - 0x00000400 Reply includes the New Tuned Name
*Completion Codes Success = 0
!Note: The Source Distinguished Name field is present if and only if the Moving request flag is set to one.

TABLE 3-continued

Restore Entry (46 (0x2E))

Remarks

This operation serves two purposes.
(a) Restoring an entry previously backed up to an external medium.
(b) Conveying an entry's information to its new location when moving an NDS leaf entry.
The Moving flag indicates which case it is; zero for (b); one for (b). In case (b), collision with an existing name is considered an error.
The Parent Entry ID indicates the immediate parent of the entry being restored. The Relative Distinguished Name identifies the entry itself.
The Source Distinguished Name identifies the entry's former name, in case of a move operation.
The Iteration Handle is used differently here from elsewhere. In other situations, the amount of data returned from the server is (potentially) larger than a single NDS message can accommodate. Here, the opposite holds. The request can be larger than the largest NDS message. When the More bit of the Request Flags field is set to one, the Restore Entry request is incomplete, and is to be continued in another Restore Entry request. If the bit is reset to zero, the client is indicating the completion of a series of Restore Entry requests. Only on completion does the server process the request. On the first NDS request of the series, the client sets the Iteration Handle to 0xFFFFFFFF; on subsequent requests, to the value returned by the server in the preceding reply. The reply format depends on the Request Flags, as indicated above. When moving an entry, the last reply conveys information about the entry in its new location; its new distinguished name (in typed form), and its new Tuned Name.

6. If step 5 was successful, the source server removes the entry from its active database. It creates a moved obituary for the entry, identifying the destination location. The obituary propagates to replicas of the source partition through the synchronization channel.

Figure 7:
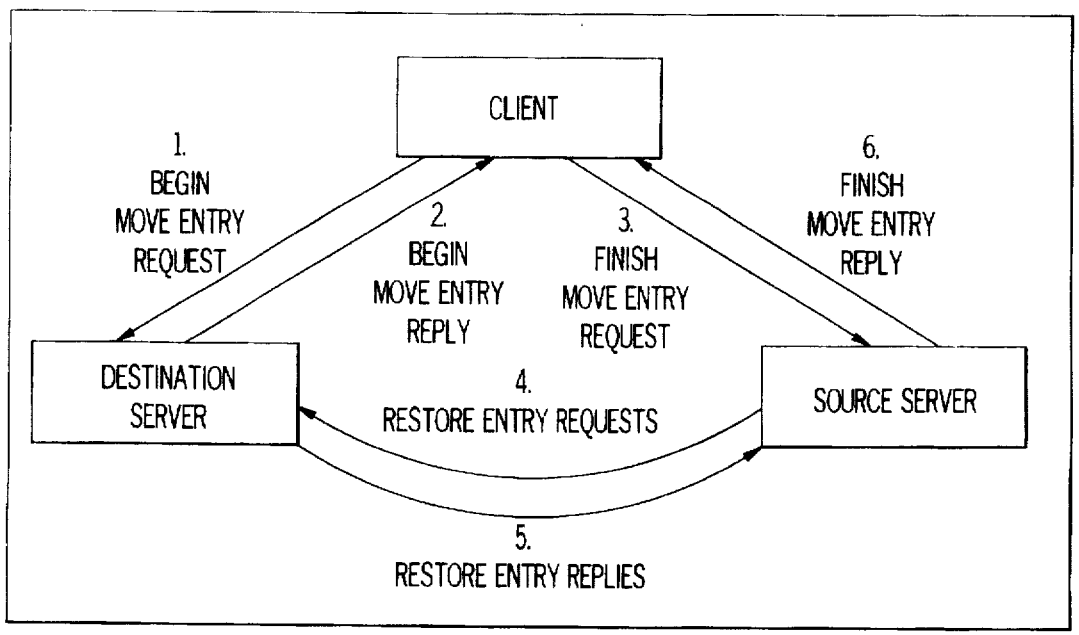
FIG. 7 shows the sequences employed by the invention to move a leaf object.

7. The source server sends a Finish Move Entry reply to the client. FIG. 7 illustrates the three-party exchange. The additional steps that follow show the interaction of a wider group of network servers.

8. If another server has an external reference to the old copy of the moved object, the source server holds a Back Link attribute for the object identifying the other server. Using information in the Back Link, it notifies the other server to update the external reference.

9. This uses the Synch External Reference operation. The source uses a "Back Link . . . Moved" obituary for each other server to keep track of which ones have been notified. If new back links appear while this operation progresses, corresponding "Back Link . . . Moved" obituaries are created. The structure of the Synch External Reference NDS Protocol verb is provided in Table 4.

TABLE 4

Synch External Reference

| Request Format | | |
|---|---|---|
| Offset | Content | Type |
| 32 | Version = 0 | Int4 |
| 36 | Flags=0 or Purge obituary | Int4 |
| 40 | Remote ID (hint) | Int4 |
| 44 | Entry Name | Ustring |
| ... | Align4 | |
| ... | Parent | Tuned Name |
| ... | Align4 | |
| Obituary Information | | |
| 1) Restored | | |
| 2) Dead | | |
| 3) Moved | | |
| 4) New RDN | | |
| Common Parameters | | |
| Type | Int2 | |
| Flags | Int2 | |
| Unused | Int4 | |
| Creation Time | Time Stamp | |
| Data Parameters | | |

TABLE 4-continued

Synch External Reference

| Restored | Creation Time |
|---|---|
| | Restored CTS |
| Dead | NULL |
| Moved | Moved Destination Name - Tuned |
| New RDN | RDN - Name |

10. Meanwhile, starting at step 3, the destination object has an Inhibit Move obituary attribute attached, indicating that a move is under way. As long as this attribute exists, the object cannot be moved again or deleted. This prevents race conditions as things settle down. Replica synchronization propagates the new object (with its Inhibit Move obituary) throughout replicas of the destination partition.

11. When (a) the deletion of the source object has been propagated throughout the source partition, and (b) the notifications of step 6 have been completed, the object is about to be purged. The source server notifies the destination server using the Release Moved Entry operation. At this point, the destination server removes the Inhibit Move obituary attribute from the new object. Through replica synchronization, the attribute removal propagates to other replicas of the destination partition. When this has occurred, and the destination server purges the obituary, the moved object becomes eligible to be moved again.

Moving a Subtree

As indicated above, from the client's viewpoint, moving a subtree looks the same as moving a single entry. The same Begin Move Entry and Finish Move Entry operations apply, as illustrated in FIG. 3. The exchange among servers is quite different, however.

Figure 8:
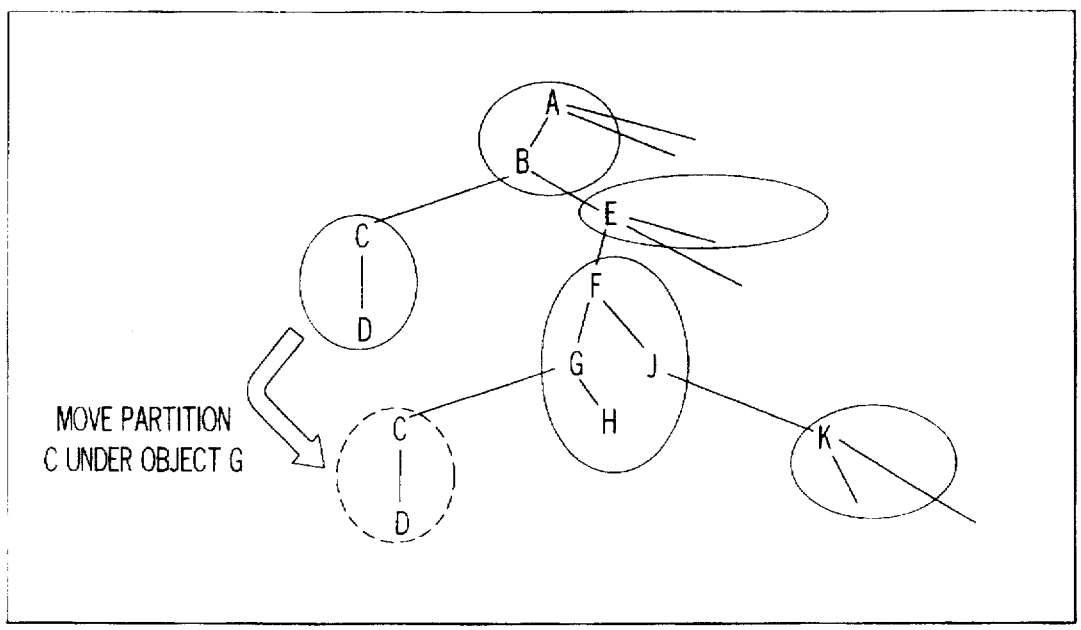
FIG. 8 shows the movement of a subtree.

FIG. 8 shows the move of a subtree. In the example, partition C is being moved under object G. (As customary, the partition is named by its root-most object-) G is in partition F. Partition A is the parent of partition C.

Three partitions participate in the operation. Each has a master replica. In the following detailed discussion of the operation to move a subtree the following terminology is used. The discussions assumes that some of the three partitions can be the same, that some of the servers can be the same, and that:

S is the server holding the master replica of partition A.
T is the server holding the master replica of partition C.
U is the server holding the master replica of partition F.
V is the server holding the master replica of server U's object.

1. The client sends a Begin Move Entry request to U. U enforces its access control to permit or deny the move operation.

2. If all is well, U replies with Success. At the same time, it records the details of the operation and starts a ten-minute timer. If the timer expires before T responds, U purges its record of the move details and the operation will not complete.

3. The client sends a Finish Move Entry request to T. T enforces its access control and the directory schema rules. Also, T locates the object representing server U in the name space, and identifies the server, V, holding the master replica of U's object. It sends V a "Control . . . Get Entry Move State" request to determine if U's object is itself moving. If it is moving, the subtree move operation cannot proceed. If any of these checks reveal a problem, T sends an error reply to the client and the operation terminates. The structure of the Control . . . Get Entry Move State NDS Protocol verb is provided in Table 5

TABLE 5

Control... Get Entry Move State

| Request Details | | |
|---|---|---|
| Offset | Content | Type |
| 40 | Verb = 2 | Int4 |
| 44 | Entry ID | Int4 |
| Reply Details | | |
| Offset | Content | Type |
| 20 | Parent Entry ID | Int4 |

This operation reports if an entry is being moved or not. The entry is indicated by Entry ID.
If the entry is being moved; the completion code "Move In Progress" is returned and the Parent Entry ID reports the new parent of the object.

4. T sends a Start Move Tree request to U. U checks the request against its expected details. It also checks that its software version—and the versions of servers identified in the back links of the destination partition root object (F)—are high enough that they support moving a subtree. If all is well, it sends a Success reply to T. In the reply, the Partition Overlap flag is set if partitions A and F are the same partition. The structure of the Start Move Tree NDS Protocol verb is provided in Table 6.

TABLE 6

Start Move Tree

| Request Details | | |
|---|---|---|
| Offset | Content | Type |
| 40 | Version=0 | Int4 |
| 44 | Flags | Int4 |
| 48 | Revision | Int4 |
| 52 | Destination ID | Int4 (on destination server) |
| ... | Source Name | Tuned Name |
| ... | Align4 | |
| ... | New RDN | Ustring |
| Reply Details | | |
| Offset | Content | Type |
| 20 | Version | Int4 |
| 24 | Flags | Int4 |
| 28 | Source ID | Int4 (on destination server) |
| 32 | Destination Root ID | Int4 (on destination server) |

Flags -
Mt_Created_ExtRef
Mt-Partition_Overlap

5. U sets F's partition operation to Move Subtree Destination It sets the partition state and the replica states to Move State 0, and the Partition Control Distinguished Name to identify C. If the leaf name of the object is being changed in the course of the move, it also adds a Tree Old RDN obituary recording the prior name. (With this information, a server can do efficient lookups even if packets arrive from not-yet synchronized servers using an unexpected name.) It starts propagating these changes to the replicas of partition F.

6. T sets C's partition operation to Move Subtree Source. It sets the replica states to Move State 0. It also creates three partition control attributes. Each of the three has State= Moved State 0 and Operation=Move Subtree Source. The Distinguished Name depends on the Type, as follows:
Type Distinguished Name
0 Identifies G (new parent object).
1 Identifies B (old parent object).
2 Empty string in the Partition overlap case; otherwise, identifies A (root object of partition immediately above C).

It starts propagating these changes to the replicas of partition C.

7. If the leaf name (relative distinguished name) of the object is being changed in the course of the move, it also adds a Tree New RDN obituary recording the new name. (With this information, a server can do efficient lookups even if packets arrive from not-yet synchronized servers using an unexpected name.) T makes a list of servers to be notified of the operation. The following servers are included in the list (duplicates are suppressed):
Servers holding replicas of partition C.
Servers holding replicas of partition F.
Servers holding external references to objects in C (as identified by back links on the objects).

This is the "Notification List." It is recorded as a Move Subtree obituary for each server of the list. T starts propagating all these changes to the replicas of partition C.

8. If the Partition Overlap flag was not set in step 4, T sends a Control request to S, indicating Lock Partition for partition A (C's parent). This prevents other partition operations on partition A while the move is in progress. For moves within the same partition, it is unnecessary to lock the parent.

9. T sends a Finish Move Entry reply to the client. The client is out of the picture from this point onward.

10. T drives completion of the operation. It sends a Move Tree request to every server in the Notification List, driven by the secondary obituaries. The structure of the Move Tree NDS Protocol request is provided in Table 7.

TABLE 7

Move Tree

| Offset | Content | Type |
|---|---|---|
| 40 | Version=0 | Int4 |
| 44 | Flags | Int4 |
| 48 | Parent Name | Tuned Name |
| ... | Align4 | |
| ... | Name | Ustring |
| ... | Align4 | |
| ... | Creation Time | Time stamp |
| ... | Destination Parent | Tuned Name |
| ... | Align4 | |
| ... | Name Flags | Int4 |
| ... | New Name | Int4 |
| ... | Align4 | |
| ... | Replica Pointer for Master | |
| Reply Details | | |
| Offset | Content | Type |
| 20 | Version | Int4 |
| 24 | Flags | Int4 |
| 28 | Replica Root ID | Int4 |

It persists with periodic retries until all have been contacted. As each
server is contacted successfully, T sets the corresponding obituary's
Notified flag. The request conveys:
The Tuned Name of C (the source)
The Tuned Name of G (the destination)
The Replica Pointer for T (the master server of partition C)

11. T adds a moved obituary to its entry for C, so that any requests about an object in partition C using its old name can be treated correctly while the operation is in progress. When a server, W, on the Notification List receives the request, its action depends on what replicas it holds of partitions C and F. In the following table:

R means the server holds a replica of the partition.

E means the server holds an external reference to the partition's root object.

N means the server holds neither of the above.

| Case        | 1 | 2 | 3 | 4 | 5 | 6 | 7 | 8 | 9 |
|-------------|---|---|---|---|---|---|---|---|---|
| Partition C | R | R | R | E | E | E | N | N | N |
| Partition F | R | E | N | R | E | N | R | E | N |

In Cases 1, 2, 3 and 5: W locally switches its record of C's parent from B to G.

In Cases 4 and 7: W locally creates a subordinate reference for partition C. Its reply has the Created Subordinate Reference flag set, informing T to add the subordinate reference to C's replica list.

In Case 6: W locally creates an external reference for G. Its reply has the Created External Reference flag set, informing T to create a back link to W.

In Case 8 and 9: These do not occur. Such servers would not be on the Notification List.

12. Once the servers on the Notification List have been successfully contacted, T sends another request to the same Notification List: End Move Subtree. This causes the Moved obituaries to be purged. Every server has seen the new name, so it is no longer necessary to deal with requests that use objects' old names. As each request completes successfully, the corresponding obituary has the Purgeable flag set.

13. Once all the obituaries are marked Purgeable, T sends a Control request to U and (in the non-Partition Overlap case) to S, indicating Unlock Partition for A and F (respectively). A server receiving this request sets the partition state and the replicas' states to On, and propagates the change to the partition's replicas through the synchronization channel. Finally, T performs the Unlock Partition operation itself for C.

With the present invention any portion of a directory tree provided that it is at the end of the tree may be moved either within a directory or to another directory. With the invention, ease of providing administration of distributed network directories increases. Accordingly, use of distributed network directories will also increase, making pervasive network computing possible.

Although one embodiment of the invention has been illustrated and described, various modifications and changes may be made by those skilled in the art without departing from the spirit and scope of the invention

We claim:

1. A method in a computer system for reorganizing a distributed directory, said method comprising the steps of:
   (a) identifying a source subtree having a root object directly subordinate to a parent object;
   (b) identifying a destination object within a destination subtree;
   (c) creating a list of computers;
   (d) for each computer on the list having at least one of the following:
      i. a replica of the source subtree and a replica of the destination subtree,
      ii. a replica of the source subtree and a reference to the root object of the destination subtree,
      iii. a replica of the source subtree and neither a replica of the destination subtree nor a reference to the root object of the destination subtree, or
      iv. a reference to the root object of the source subtree and a reference to the root object of the destination subtree, changing in each such computer the direct subordination of the root object in the source subtree from the parent object to the destination object;

(e) for each computer on the list having at least one of the following:
      i. a reference to the root object of the source subtree and a replica of the destination subtree, or
      ii. neither a replica of the source subtree nor a reference to the root object of the source subtree, and a replica of the destination subtree, creating in each such computer a reference to the source subtree; and (f) for each computer on the list having a reference to the root object of the source subtree and neither a replica of the destination subtree nor a reference to the root object of the destination subtree, creating in each such computer a reference to the destination object.

2. A method as recited in claim 1, wherein step (d) is achieved by switching in the local record of each such computer the root object's parent from the parent object to the destination object.

3. A method as recited in claim 1, wherein step (e) is achieved by creating a subordinate reference for the source subtree.

4. A method as recited in claim 1, wherein step (f) is achieved by creating an external reference for the destination object.

5. A method as recited in claim 1, wherein one of the computers is a master server holding a master replica of the source subtree.

6. A method as recited in claim 5, further comprising in step (e) the step of informing the master server to add the subordinate reference to the replica list of the source subtree.

7. A method as recited in claim 5, further comprising in step (f) the step of informing the master server to create a back link to each such computer.

8. A method as recited in claim 5, wherein the master server sends a request to each of the computers on the list to move the source subtree.

9. A computer system as recited in claim 1, wherein the source and destination subtrees are partitions in the distributed directory.

10. A method as recited in claim 1, wherein the computers are interconnected in a client/server network.

11. A method as recited in claim 10, wherein the reorganization is initiated by a client in the network.

12. A computer system as recited in claim 10, wherein the list of computers includes one or more servers that hold one or more of the following:
   (a) a replica of the source subtree;
   (b) a replica of the destination subtree; or
   (c) a reference to an object in the source subtree.

13. A computer readable medium comprising a program for reorganizing a distributed directory having a hierarchy of objects, said program being operative to perform the steps of:
   (a) identifying a source subtree having a root object directly subordinate to a parent object,
   (b) identifying a destination object within a destination subtree;
   (c) creating a list of computers;
   (d) for each computer on the list having at least one of the following:

i. a replica of the source subtree and a replica of the destination subtree, ii. a replica of the source subtree and a reference to the root object of the destination subtree, iii. a replica of the source subtree and neither a replica of the destination subtree nor a reference to the root object of the destination subtree, or iv. a reference to the root object of the source subtree and a reference to the root object of the destination subtree, changing in each such computer the direct subordination of the root object in the source subtree from the parent object to the destination object;

(e) for each computer on the list having at least one of the following:

i. a reference to the root object of the source subtree and a replica of the destination subtree, or ii. neither a replica of the source subtree nor a reference to the root object of the source subtree, and a replica of the destination subtree, creating in each such computer a reference to the source subtree; and (f) for each computer on the list having a reference to the root object of the source subtree and neither a replica of the destination subtree nor a reference to the root object of the destination subtree, creating in each such computer a reference to the destination object.

14. A computer system, comprising:

(a) a plurality of objects, said objects including:
  i. a parent object,
  ii. a root object, and
  iii. a destination object;

(b) a plurality of pointers defining a hierarchy in the objects, said hierarchy including:
  i. a source subtree holding the root object, wherein the root object is the child of the parent object, and
  ii. a destination subtree holding the destination object;

(c) a plurality of computers, wherein one or more of said plurality of computers stores replicas of one or more of said objects and at least a portion of said plurality of pointers; and (d) a reorganization mechanism operative to reorganize the hierarchy by modifying the pointers in one or more of the plurality of computers such that the parent of the root object of the source subtree is changed to the destination object of the destination subtree, and the root object of the source subtree is no longer a child of the parent object of the parent subtree.

15. A computer system as recited in claim 14, wherein the reorganization mechanism performs one or more of the following steps:

(a) for each computer having at least one of the following:
  i. a replica of the source subtree and a replica of the destination subtree,
  ii. a replica of the source subtree and a reference to the root object of the destination subtree,
  iii. a replica of the source subtree and neither a replica of the destination subtree nor a reference to the root object of the destination subtree, or
  iv. a reference to the root object of the source subtree and a reference to the root object of the destination subtree, changing in each such computer the parent of the root object in the source subtree from the parent object to the destination object;

(b) for each computer having at least one of the following:
  i. a reference to the root object of the source subtree and a replica of the destination subtree, or
  ii. neither a replica of the source subtree nor a reference to the root object of the source subtree, and a replica of the destination subtree, creating in each such computer a reference to the source subtree; and (c) for each computer having a reference to the root object of the source subtree and neither a replica of the destination subtree nor a reference to the root object of the destination subtree, creating in each such computer a reference to the destination object.

16. A computer system as recited in claim 15, wherein step (a) is achieved by switching in the local record of each such computer the root object's parent from the parent object to the destination object.

17. A computer system as recited in claim 15, wherein step (b) is achieved by creating a subordinate reference for the source subtree.

18. A computer system as recited in claim 15, wherein step (c) is achieved by creating an external reference for the destination object.

19. A computer system as recited in claim 15, wherein one of said computers is a master server holding a master replica of the source subtree.

20. A computer system as recited in claim 19, further comprising in step (b) the step of informing the master server to add the subordinate reference to the replica list of the source subtree.

21. A computer system as recited in claim 19, further comprising in step (c) the step of informing the master server to create a back link to each such relevant server.

22. A computer system as recited in claim 19, wherein the master server sends a request to each of the computers to move the source subtree.

23. A computer system as recited in claim 14, wherein the plurality of computers are interconnected in a client/server network.

24. A computer system as recited in claim 14, wherein the hierarchy of objects comprises a distributed directory.

25. A computer system as recited in claim 24, wherein the source and destination subtrees are partitions in the distributed directory.

26. A method in a computer network of reorganizing a distributed directory, comprising the steps of:

(a) sending a request to move a source subtree from a parent object in a parent subtree to a destination object in a destination subtree;

(b) checking whether the requested move is permitted, and terminating the method if the request is not permitted;

(c) if an object is being renamed in the request, recording the new and old names of such object;

(d) creating a list of computers;

(e) modifying the pointers in one or more of the computers on the list such that the root object of the source subtree is directly subordinate to the destination object of the destination subtree, and the root object of the source subtree is not directly subordinate to the parent object of the parent subtree.

27. A method as recited in claim 26, wherein the checking step comprises one or more of the following steps:

(a) enforcing access control;

(b) enforcing directory schema rules;

(c) checking whether the object of the server holding the master replica of the destination subtree is itself involved in a reorganization unrelated to the client's request; or (d) checking whether a software version can support the requested move.

28. A method as recited in claim 26, further comprising the step of checking whether the parent and destination subtrees overlap, and locking the parent subtree if the parent and destination subtrees do not overlap.

29. A method as recited in claim 26, wherein the source, parent and destination subtrees are partitions in the distributed directory.

30. A method as recited in claim 26 wherein step (e) is achieved by one or more of the following steps:
   (a) for each computer on the list having at least one of the following:
      i. a replica of the source subtree and a replica of the destination subtree,
      ii. a replica of the source subtree and a reference to the root object of the destination subtree,
      iii. a replica of the source subtree and neither a replica of the destination subtree nor a reference to the root object of the destination subtree, or
      iv. a reference to the root object of the source subtree and a reference to the root object of the destination subtree, changing in each such computer the parent of the root object in the source subtree from the parent object to the destination object;
   (b) for each computer on the list having at least one of the following:
      i. a reference to the root object of the source subtree and a replica of the destination subtree, or
      ii. neither a replica of the source subtree nor a reference to the root object of the source subtree, and a replica of the destination subtree, creating in each such computer a reference to the source subtree; and
   (c) for each computer on the list having a reference to the root object of the source subtree and neither a replica of the destination subtree nor a reference to the root object of the destination subtree, creating in each such computer a reference to the destination object.

31. A computer system, comprising:
   (a) a distributed directory having a hierarchy of objects, said distributed directory comprising:
      i. a parent object,
      ii. a source subtree having a root object that is a child of the parent object, and
      iii. a destination object within a destination subtree;
   (b) a plurality of computers that hold one or more of the following:
      i. a replica of the source subtree,
      ii. a replica of the destination subtree, or
      iii. a reference to an object in the source subtree; and
   (c) for each computer having at least one of the following:
      i. a replica of the source subtree and a replica of the destination subtree,
      ii. a replica of the source subtree and a reference to the root object of the destination subtree,
      iii. a replica of the source subtree and neither a replica of the destination subtree nor a reference to the root object of the destination subtree, or
      iv. a reference to the root object of the source subtree and a reference to the root object of the destination subtree, means for changing in each such computer the parent of the root object in the source subtree from the parent object to the destination object;
   (d) for each computer having at least one of the following:
      i. a reference to the root object of the source subtree and a replica of the destination subtree, or
      ii. neither a replica of the source subtree nor a reference to the root object of the source subtree, and a replica of the destination subtree, means for creating in each such computer a reference to the source subtree; and
   (e) for each computer having a reference to the root object of the source subtree and neither a replica of the destination subtree nor a reference to the root object of the destination subtree, means for creating in each such computer a reference to the destination object.

\* \* \* \* \*